(12) United States Patent
Horn et al.

(10) Patent No.: US 11,606,235 B2
(45) Date of Patent: Mar. 14, 2023

(54) COMMUNICATION OF MOBILE STATION-SPECIFIC INFORMATION BEFORE A CYCLIC PREFIX

(71) Applicant: QUALCOMM Incorporated, San Diego, CA (US)

(72) Inventors: Idan Michael Horn, Hod Hasharon (IL); Amit Bar-Or Tillinger, Tel-Aviv (IL); Shay Landis, Hod Hasharon (IL)

(73) Assignee: QUALCOMM INCORPORATED, San Diego, CA (US)

( * ) Notice: Subject to any disclaimer, the term of this patent is extended or adjusted under 35 U.S.C. 154(b) by 204 days.

(21) Appl. No.: 17/186,727

(22) Filed: Feb. 26, 2021

(65) Prior Publication Data

US 2022/0278878 A1    Sep. 1, 2022

(51) Int. Cl.
| | | |
|---|---|---|
| *H04L 27/26* | (2006.01) | |
| *H04L 5/00* | (2006.01) | |
| *H04W 72/04* | (2023.01) | |
| *H04L 43/16* | (2022.01) | |

(52) U.S. Cl.
CPC ........ *H04L 27/2605* (2013.01); *H04L 5/0048* (2013.01); *H04L 5/0053* (2013.01); *H04L 43/16* (2013.01); *H04W 72/042* (2013.01)

(58) Field of Classification Search
CPC . H04L 27/2605; H04L 5/0048; H04L 5/0053; H04L 43/16; H04L 5/0094; H04L 27/2607; H04L 27/2646; H04L 27/2602; H04W 72/042; Y02D 30/70
See application file for complete search history.

(56) References Cited

U.S. PATENT DOCUMENTS

| | | | | |
|---|---|---|---|---|
| 2014/0016620 | A1* | 1/2014 | Singh | H04L 5/0023 370/336 |
| 2022/0182993 | A1* | 6/2022 | Zhang | H04L 27/2607 |
| 2022/0210784 | A1* | 6/2022 | Sakhnini | H04W 72/0446 |
| 2022/0278721 | A1* | 9/2022 | Fukuzono | H04B 7/0413 |

FOREIGN PATENT DOCUMENTS

| | | | | |
|---|---|---|---|---|
| EP | 2683183 A1 * | 1/2014 | ........ | H04W 36/0055 |
| WO | WO-2018127208 A1 * | 7/2018 | ............. | H04L 27/26 |
| WO | WO-2021171084 A1 * | 9/2021 | | |

\* cited by examiner

*Primary Examiner* — Mounir Moutaouakil
(74) *Attorney, Agent, or Firm* — Harrity & Harrity, LLP

(57) ABSTRACT

Various aspects of the present disclosure generally relate to wireless communication. In some aspects, an mobile station (MS) may receive an indication of a cyclic prefix (CP) length for one or more subsequent communications and an indication that MS-specific information is to be transmitted before the CP for the one or more subsequent communications. The MS may receive the one or more subsequent communications having the MS-specific information transmitted before the CP. Numerous other aspects are described.

30 Claims, 9 Drawing Sheets

COMMUNICATION OF MOBILE STATION-SPECIFIC INFORMATION BEFORE A CYCLIC PREFIX

FIELD OF THE DISCLOSURE

Aspects of the present disclosure generally relate to wireless communication and to techniques and apparatuses for communication of mobile station-specific information before a cyclic prefix.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes receiving, by the mobile station, an indication of a CP length for one or more subsequent communications and an indication that mobile station (MS)-specific information is to be transmitted before the CP for the one or more subsequent communications; and receiving, by the mobile station, the one or more subsequent communications having the MS-specific information transmitted before the CP.

In some aspects, a mobile station for wireless communication includes a memory; and one or more processors, operatively coupled to the memory, configured to: receive an indication of a CP length for one or more subsequent communications and an indication that MS-specific information is to be transmitted before the CP for the one or more subsequent communications; and receive the one or more subsequent communications having the MS-specific information transmitted before the CP.

In some aspects, an apparatus for wireless communication includes means for receiving an indication of a CP length for one or more subsequent communications and an indication that apparatus-specific information is to be transmitted before the CP for the one or more subsequent communications; and means for receiving the one or more subsequent communications having the apparatus-specific information transmitted before the CP.

In some aspects, a non-transitory computer-readable medium storing a set of instructions for wireless communication includes one or more instructions that, when executed by one or more processors of a mobile station, cause the MS to: receive an indication of a CP length for one or more subsequent communications and an indication that MS-specific information is to be transmitted before the CP for the one or more subsequent communications; and receive the one or more subsequent communications having the MS-specific information transmitted before the CP.

In some aspects, a method of wireless communication performed by a base station includes transmitting, by the base station, an indication of a CP length for one or more subsequent communications and an indication that mobile station specific information is to be transmitted before the CP for the one or more subsequent communications; and transmitting, by the base station, the one or more subsequent communications having the MS-specific information transmitted before the CP.

In some aspects, a base station for wireless communication includes a memory; and one or more processors, operatively coupled to the memory, configured to: transmit an indication of a CP length for one or more subsequent communications and an indication that mobile station specific information is to be transmitted before the CP for the one or more subsequent communications; and transmit the one or more subsequent communications having the MS-specific information transmitted before the CP.

In some aspects, a non-transitory computer-readable medium storing a set of instructions for wireless communication includes one or more instructions that, when executed by one or more processors of a base station, cause the base station to: transmit an indication of a CP length for one or more subsequent communications and an indication that mobile station specific information is to be transmitted before the CP for the one or more subsequent communications; and transmit the one or more subsequent communications having the MS-specific information transmitted before the CP.

In some aspects, an apparatus for wireless communication includes means for transmitting an indication of a CP length for one or more subsequent communications and an indication that mobile station specific information is to be transmitted before the CP for the one or more subsequent communications; and means for transmitting the one or more subsequent communications having the MS-specific information transmitted before the CP.

Aspects generally include a method, apparatus, system, computer program product, non-transitory computer-readable medium, user equipment, base station, wireless communication device, and/or processing system as substantially described herein with reference to and as illustrated by the drawings specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
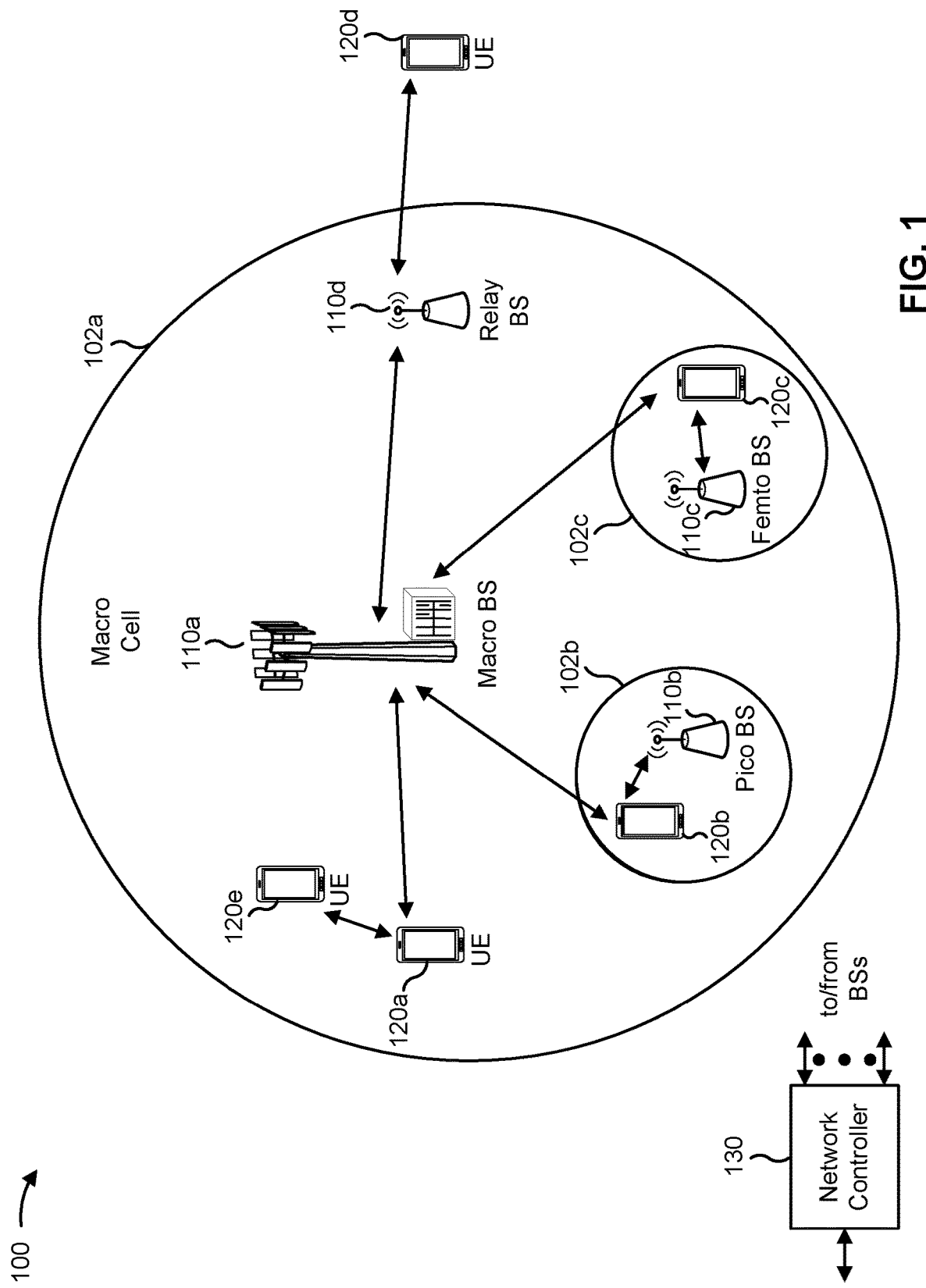
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs)

and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
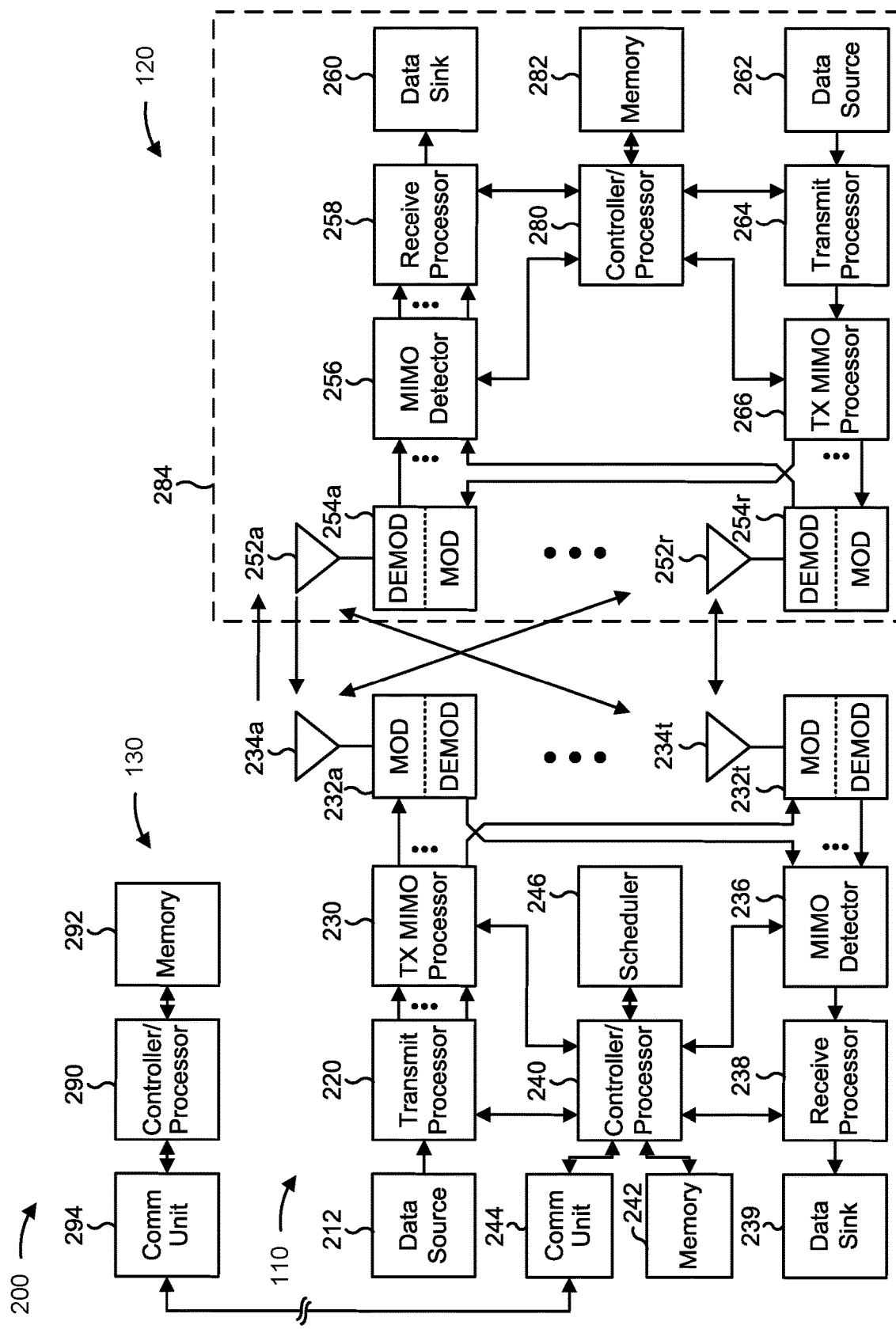
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with communication of mobile station-specific information before a cyclic prefix, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples. In some aspects, the mobile station described herein is the UE 120, is included in the UE 120, or includes one or more components of the UE 120 shown in FIG. 2.

In some aspects, the mobile station includes means for receiving, by the mobile station, an indication of a CP length for one or more subsequent communications and an indication that MS-specific information is to be transmitted before the CP for the one or more subsequent communications; or means for receiving, by the mobile station, the one or more subsequent communications having the MS-specific information transmitted before the CP. In some aspects, the means for the mobile station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for receiving the indication of the CP length for the one or more subsequent communications and the indication that the MS-specific information is to be transmitted before the CP for the one or more subsequent communications via one or more of downlink control information or medium access control signaling.

In some aspects, the mobile station includes means for transmitting an indication of a capability of the MS to receive MS-specific information before the CP.

In some aspects, the mobile station includes means for transmitting a request to receive MS-specific information before the CP.

In some aspects, the base station includes means for transmitting, by the base station, an indication of a CP length for one or more subsequent communications and an indication that mobile station specific information is to be transmitted before the CP for the one or more subsequent communications; or means for transmitting, by the base station, the one or more subsequent communications having the MS-specific information transmitted before the CP. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting the indication of the CP length for the one or more subsequent communications and the indication that the MS-specific information is to be transmitted before the CP for the one or more subsequent communications via one or more of downlink control information or medium access control signaling.

In some aspects, the base station includes means for receiving an indication of a capability of the MS to receive MS-specific information before the CP.

In some aspects, the base station includes means for receiving a request to receive MS-specific information before the CP.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
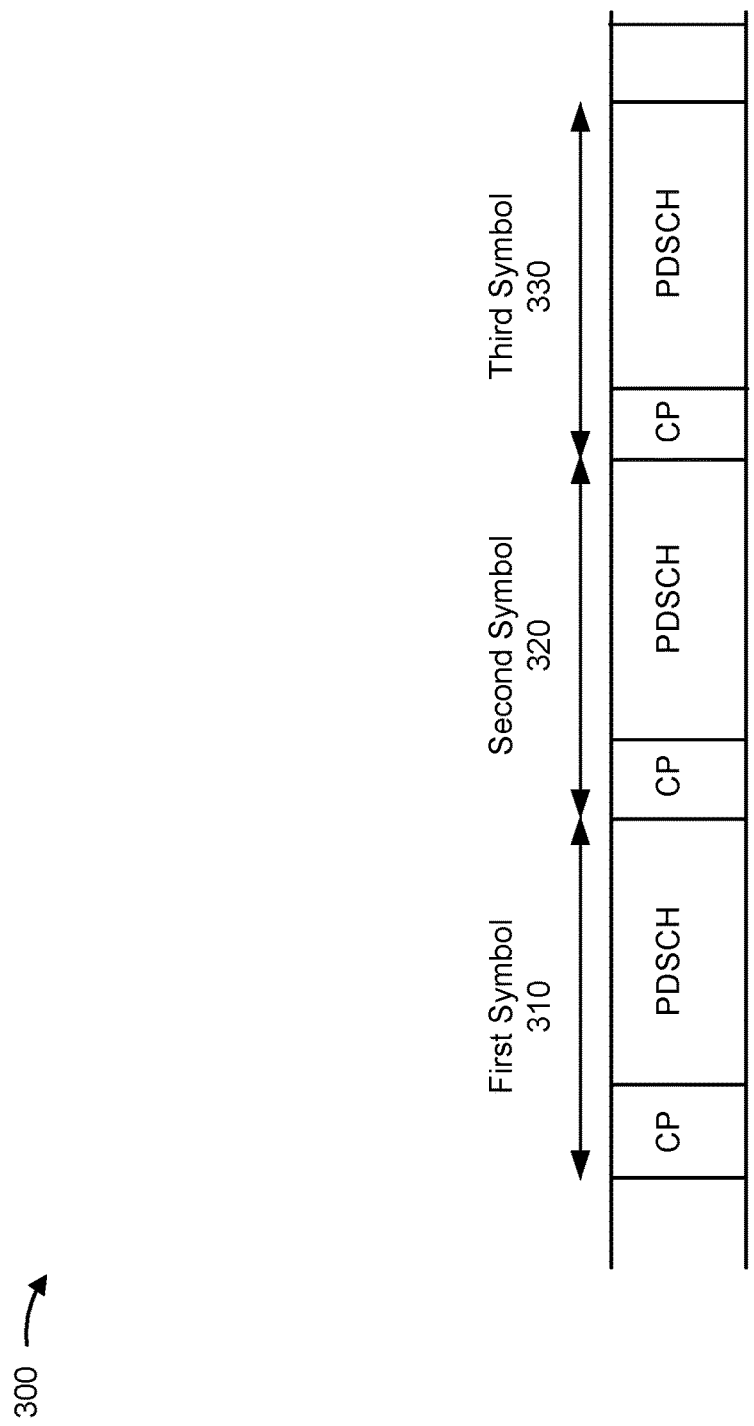
FIG. 3 is a diagram illustrating an example of symbols having cyclic prefixes, in accordance with the present disclosure.

FIG. 3 is a diagram illustrating an example 300 of symbols having cyclic prefixes, in accordance with the present disclosure. A mobile station (e.g., a UE) may communicate with a base station via the symbols shown in FIG. 3. The symbols (e.g., OFDM symbols) may be included in a set of resources allocated to the mobile station for communicating with the base station. For example, the symbols may be associated with a resource allocation for a downlink communication, such as a physical downlink shared channel (PDSCH) communication, a physical downlink control channel (PDCCH) communication, or a paging signal, among other examples.

As shown in FIG. 3, each of a first symbol 310, a second symbol 320, and a third symbol 330 includes a CP before a PDSCH. The mobile station may use the cyclic prefixes as a guard to reduce or eliminate inter-symbol interference. For example, the cyclic prefix may reduce or eliminate reception of signals associated with a previous symbol during a PDSCH portion of the symbol. Additionally, or alternatively, the mobile station may use the CP to assist in performing a discrete Fourier transform and/or decoding data carried on the PDSCH. Content of the CPs may include a repetition of signaling at the end of the symbol to improve modeling of the signal for convolution and/or decoding signaling of the symbol. The mobile station may be configured to discard sampling of the CP after performing the discrete Fourier transform. In other words, the CP may be overhead that is used to improve communications but does not increase throughput.

As indicated above, FIG. 3 is provided as an example. Other examples may differ from what is described with regard to FIG. 3.

Some networks operate using relatively high frequency bands. For example, networks may operate using FR2 or frequency ranges that are higher than FR2 (e.g., Sub-THz, FR4, or FR5, among other examples). However, communications in high frequency bands may have a relatively high power consumption. For example, a mobile station may consume more power via antenna groups generating and/or receiving signals at these high frequencies. Additionally, a mobile station may consume more power via operation of an analog to digital converter (ADC), digital front end (DFE) components, and/or baseband processing of the signals at these high frequencies.

In some implementations described herein, a mobile station may receive one or more communications having MS-specific information transmitted before the CP. In some aspects, the CP may be shortened (e.g., as compared to an alternate and/or configured CP length) such that the CP portion of a symbol ends at substantially a same time without regard to an amount of MS-specific information transmitted before the CP. In other words, the CP may be delayed to fit the MS-specific information and may end at substantially the same time. This may prevent shortening of the PDSCH to fit the MS-specific information.

The MS-specific information may include information that may improve power consumption for receiving the one or more communications. For example, the MS-specific information may indicate a number of bits to use in an ADC during reception of signals received via the PDSCH. The UE may use the indication of the number of bits to calibrate the ADC, which may reduce power consumption of the ADC and/or baseband processing of the signals. Additionally, or alternatively, the MS-specific information may include a coding rate configured for the one or more subsequent communications, a constellation configured for the one or more subsequent communications, and/or an allocation signal (e.g., to indicate whether the PDSCH has resources allocated for the UE to receive signals). In some aspects, the MS-specific information may include an indication of a radio network temporary identifier (RNTI) associated with the mobile station to indicate that the MS-specific information is intended for the mobile station.

In some aspects, the base station may indicate that MS-specific information is to be transmitted before the CP (e.g., via downlink control information (DCI) and/or via a medium access control control element, among other examples). In some aspects, the base station may indicate that the MS-specific information is to be transmitted before the CP in one or more symbols (e.g., a first symbol of a slot, a control symbol, or a symbol having a lengthened CP, among other examples). In some aspects, the base station may indicate types of information to be included in the MS-specific information. In some aspects, the base station may indicate that the MS-specific information is to be transmitted before the CP based at least in part on the UE reporting a relatively high signal-to-interference-plus-noise ratio (SINR) and/or a relatively small delay spread, among other examples.

Based at least in part on the base station transmitting, and the mobile station receiving, the MS-specific information before the CP, the UE may conserve power resources. Based at least in part on conserving power resources, the UE may be configured to increase throughput by, for example, increasing a bandwidth for communications and/or reducing an inactive time between active times, among other examples.

Figure 4:
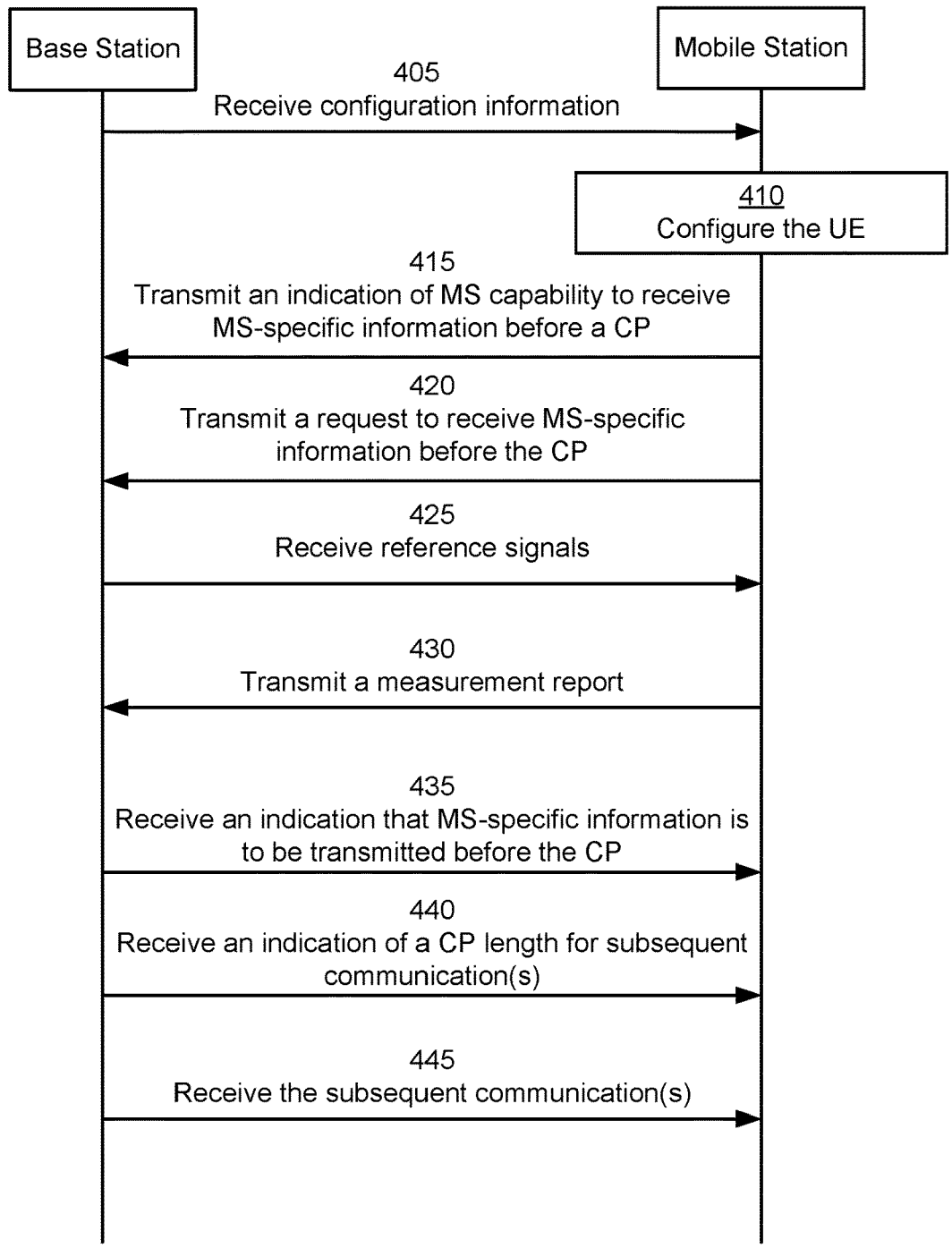
FIGS. 4 and 5 are diagrams illustrating examples associated with communication of mobile station-specific information before a cyclic prefix, in accordance with the present disclosure.

FIG. 4 is a diagram illustrating an example 400 associated with communication of mobile station-specific information before a cyclic prefix, in accordance with the present disclosure. As shown in FIG. 4, a mobile station (e.g., UE 120) may communicate with a base station (e.g., base station 110). The mobile station and the base station may be part of a wireless network (e.g., wireless network 100). The mobile station and the base station may communicate using a frequency band that is within FR2 or a higher frequency range.

As shown by reference number 405, the mobile station may receive configuration information (e.g., from the base station, another base station, and/or from another mobile station, among other examples) and/or may determine the configuration information based at least in part on a communication protocol. In some aspects, the mobile station may receive the configuration information via one or more of radio resource control (RRC) signaling, medium access control (MAC) control elements (MAC CEs), DCI, and/or the like. In some aspects, the configuration information may include an indication of one or more configuration parameters (e.g., already known to the mobile station) for selection by the mobile station, and/or explicit configuration information for the mobile station to use to configure the mobile station, among other examples.

In some aspects, the configuration information may indicate that the mobile station is to be configured to communicate using CPs with a dynamic and/or configurable length. In some aspects, the configuration information may indicate that the mobile station is to transmit an indication of a capability to receive MS-specific information before a CP. In some aspects, the configuration information may indicate that the mobile station is to transmit a request to receive MS-specific information before the CP (e.g., based at least in part on one or more parameters determined by the mobile station). In some aspects, the configuration information may indicate that the base station is to transmit, and the mobile station is to receive, an indication that MS-specific information is to be transmitted before the CP. In some aspects, the configuration information may indicate that the mobile station is to receive the indication via dynamic signaling. In some aspects, the configuration information may indicate types of information that the MS-specific information may include and/or how later signaling may indicate the types of information that the MS-specific information may include.

As shown by reference number 410, the mobile station may configure the mobile station for communicating with the base station. In some aspects, the mobile station may configure the mobile station based at least in part on the configuration information. In some aspects, the mobile station may be configured to perform one or more operations described herein.

As shown by reference number 415, the mobile station may transmit, and the base station may receive, an indication of a capability of the mobile station to receive MS-specific information before a CP. In some implementations, the indication may be included in a capabilities report that is based at least in part on a configuration of the mobile station. For example, the mobile station may indicate whether the mobile station is configured to switch a bit number for one or more ADC components. Additionally, or alternatively, the indication may be included dynamic signaling, such as uplink control information and/or a MAC CE to indicate a capability of the mobile station to receive MS-specific information before a CP based at least in part on one or more parameters. For example, the parameters may include a measurement of signal strength (e.g., via RSRP, RSSI, and/or CQI, among other examples), a delay spread of received signals, a power state of the UE, and/or an interference measurement, among other examples.

As shown by reference number 420, the mobile station may transmit, and the base station may receive, a request to receive MS-specific information. In some aspects, the request may include the indication of mobile station capability to receive MS-specific information before a CP, as described in connection to reference number 415.

As shown by reference number 425, the mobile station may receive, and the base station may transmit, reference signals. For example, the base station may transmit one or more channel state information reference signals and/or synchronization signal blocks for measurement by the mobile station. In some aspects, the mobile station may measure the reference signals to determine one or more metrics, such as an SINR, an RSSI, an RSRP, and/or a CQI associated with communications with the base station.

As shown by reference number 430, the mobile station may transmit, and the base station may receive, a measurement report. The measurement report may indicate measurements of the reference signals to the base station implicitly (e.g., with an indication that is based at least in part on the measurements) or explicitly (e.g., a reporting of one or more of the measurements directly).

As shown by reference number 435, the mobile station may receive, and the base station may transmit, an indication that MS-specific information is to be transmitted before the CP for one or more subsequent communications. In some aspects, the mobile station may receive the indication that the MS-specific information is to be transmitted before the CP for the one or more subsequent communications via DCI or MAC signaling (e.g., one or more MAC CEs).

In some aspects, the base station may transmit the indication that MS-specific information is to be transmitted before the CP for one or more subsequent communications based at least in part on an SINR (e.g., as measured and indicated by the mobile station or as measured by the base station) and/or an RSRP that satisfies a threshold (e.g., as measured and indicated by the mobile station or as measured by the base station). In other words, the base station may determine to transmit the indication that MS-specific information is to be transmitted before the CP for one or more subsequent communications based at least in part on an SINR and/or the RSRP, among other examples.

In some aspects, the base station may determine whether to transmit the indication that MS-specific information is to be transmitted before the CP based at least in part on a reported SINR (e.g., signal-to-noise ratio (SNR)) and/or a PDSCH coding rate. For example, if the reported SINR satisfies a threshold (e.g., meets or exceeds the threshold), the base station may optionally determine to transmit the indication. If the reported SINR fails to satisfy the threshold (e.g., is less than the threshold), the base station may determine to not transmit MS-specific information before the CP. If the SINR satisfies the threshold, the base station may further determine a PDSCH coding rate. Based at least in part on using a relatively high PDSCH coding rate, the ADC bit number may be high and the base station may transmit the indication that MS-specific information is to be transmitted before the CP so the mobile station does not attempt to use a relatively low ADC bit number to receive the one or more subsequent communications. Based at least in part on using a relatively low PDSCH coding rate, the ADC bit number may be low and the base station may transmit the indication that MS-specific information is to be transmitted before the CP so the mobile station may use the low ADC bit number to conserve power when receiving the one or more subsequent communications. Alternatively, the base station may not transmit the indication that MS-specific information is to be transmitted before the CP when using a low PDSCH coding rate based at least in part on a configuration of the mobile station to first attempt to decode the one or more subsequent communications using the low ADC bit number.

CP length based at least in part on the SINR and/or the RSRP, among other examples. In some aspects, the base station may transmit the indication that MS-specific information is to be transmitted before the CP for one or more subsequent communications based at least in part on receiving an indication that the mobile station is in a low-power mode.

In some aspects, the indication may indicate one or more types of information to be signaled in the MS-specific information. The one or more types of information may include an indication of a number of ADC converter bits to use for receiving the one or more subsequent communications, a coding rate configured for the one or more subsequent communications, a constellation configured for the one or more subsequent communications, an allocation signal, and/or an indication of an RNTI associated with the MS, among other examples. In some aspects, the indication of the RNTI may include a portion of the RNTI associated with the mobile station.

In some aspects, the indication may be associated with a configured number of subsequent communications. In some aspects, the indication may include an indication of a number of subsequent communications that are to be transmitted with MS-specific information before the CP. In some aspects, the indication may be applied to subsequent communications (e.g., in one or more symbols of the subsequent communications) until subsequent signaling indicates that subsequent communications will not be transmitted with MS-specific information before the CP.

As shown by reference number 440, the UE may receive, and the base station may transmit, an indication of a CP length for the one or more subsequent communications. In some aspects, the indication of the CP length may be received in a same communication as the indication that the MS-specific information is to be transmitted before the CP. In some aspects, the mobile station may receive the indication of the CP length via DCI or MAC signaling (e.g., one or more MAC CEs). In some aspects, a sum of a duration of the CP length and a duration of resources allocated for the MS-specific information is equal to a duration of a configured alternate CP length (e.g., a standard CP length used when communications are not transmitted with MS-specific information before the CP).

In some aspects, the CP length may be based at least in part on an SINR (e.g., as measured and indicated by the mobile station or as measured by the base station), and/or and RSRP (e.g., as measured and indicated by the mobile station or as measured by the base station). In other words, the base station may determine the CP length based at least in part on the SINR and/or the RSRP, among other examples.

In some aspects, the indication may explicitly indicate the CP length, a starting time for the CP, or a percentage decrease from a duration of a configured alternate CP length (e.g., a configured standard CP length). In some aspects, the indication may implicitly indicate the CP length based at least in part on indicating one or more types of information to be signaled in the MS-specific information. In some aspects, the indication of the CP length may include an indication of the one or more types of information to be signaled in the MS-specific information.

As shown by reference number 445, the mobile station may receive, and the base station may transmit, the one or more subsequent communications having the MS-specific information before the CP. In some aspects, the mobile station may receive the MS-specific information before attempting to receive and/or decode signaling on a remaining portion of the symbol (e.g., a PDSCH symbol or a PDCCH symbol). In some aspects, the mobile station may use an indication of the RNTI to determine that the MS-specific information is intended for the mobile station. In some aspects, the mobile station may use an allocation signal to determine whether the one or more subsequent communications have resources allocated for a downlink transmission to the mobile station and/or whether to wakeup or return to a sleep mode (e.g., in a discontinuous reception (DRX) configuration). In some aspects, the mobile station may use an indicated ADC bit number to configure the ADC and/or baseband processing components to decode signaling associated with the one or more subsequent communications.

Based at least in part on the base station transmitting, and the mobile station receiving the MS-specific information before the CP, the UE may conserve power resources. Based at least in part on conserving power resources, the UE may be configured to increase throughput by, for example, increasing a bandwidth for communications, and/or reducing an inactive time between active times, among other examples.

As indicated above, FIG. 4 is provided as an example. Other examples may differ from what is described with regard to FIG. 4.

Figure 5:
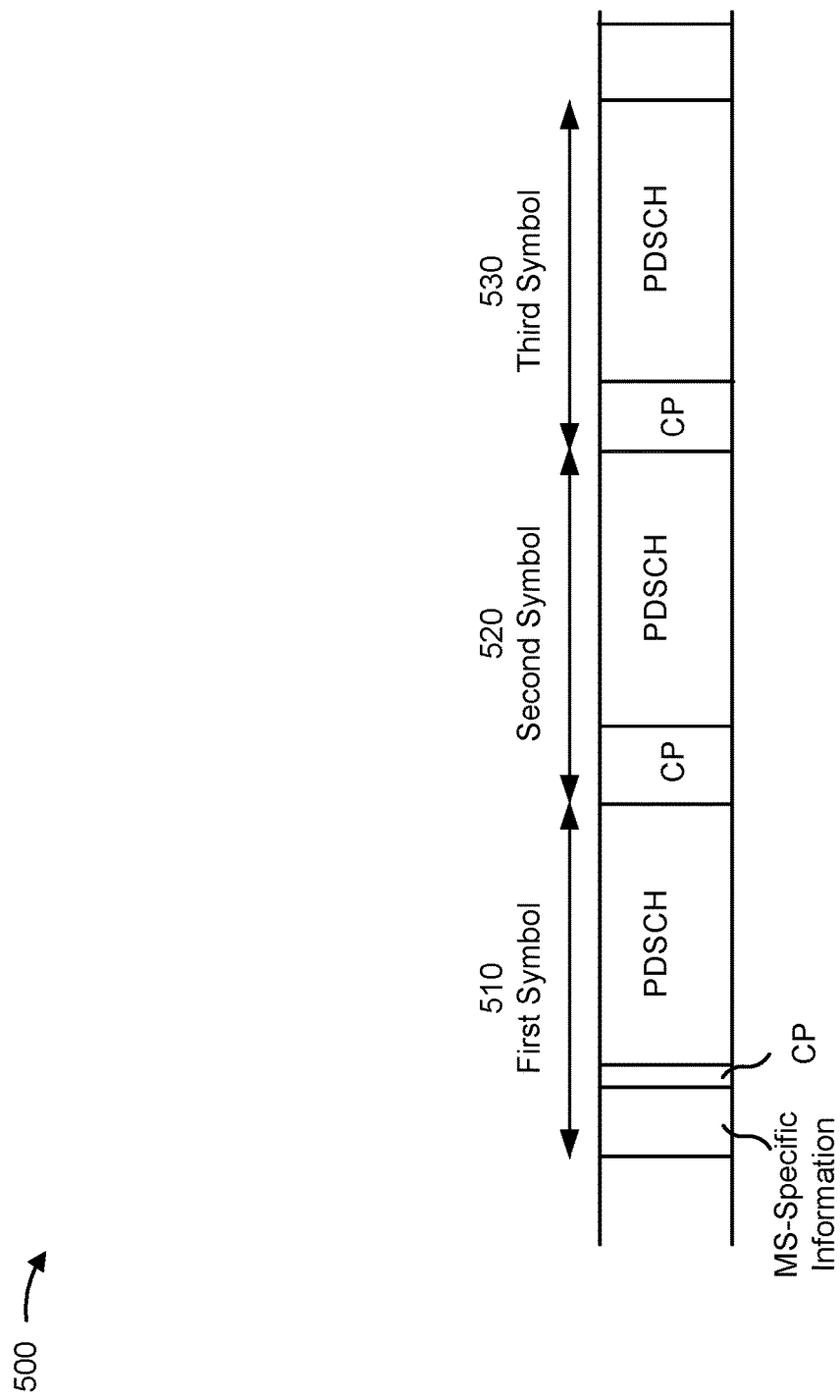

FIG. 5 is a diagram illustrating an example 500 associated with communication of mobile station-specific information before a cyclic prefix, in accordance with the present disclosure. As shown in FIG. 4, a mobile station (e.g., UE 120) may communicate with a base station (e.g., base station 110). The symbols (e.g., OFDM symbols) may be included in a set of resources allocated to the mobile station for communicating with the base station. For example, symbols shown in FIG. 5 may be associated with a resource allocation for a downlink communication, such as a PDSCH communication, a PDCCH communication, or a paging signal, among other examples.

As shown in FIG. 5, each of a first symbol 510, a second symbol 520, and a third symbol 530 includes a CP before a PDSCH. In some aspects, the first symbol 510 may include MS-specific information based at least in part on the first symbol 510 having a length that is greater than other symbols (e.g., greater than the second symbol 520 and the third symbol 330). For example, the first symbol 510 may be configured with an extra 0.5 microseconds. In some aspects, a symbol may be configured with an extra 0.5 microseconds based on being a first symbol in a slot that is configured with an extra 0.5 microsecond (e.g., a particular slot of a set of n consecutive slots). In some aspects, a slot that is configured with the extra 0.5 microseconds may include multiple symbols with lengths that are greater than other symbols (e.g., other symbols of the slot or symbols of another slot in the set of n consecutive slots, among other examples). For example, 5 symbols of the slot may have lengths that are extended by 0.1 microseconds. In some aspects, any symbol that has an extended length (e.g., compared with other symbols) may include MS-specific information.

In some aspects, the mobile station may determine to attempt to receive the MS-specific information based at least in part on receiving an indication from the base station that one or more subsequent communications is to be transmitted with the MS-specific information before the CP. In some aspects, the mobile station may use the MS-specific information to determine whether to wakeup and/or whether to attempt to receive communications with the first symbol 510, the second symbol 520, and/or the third symbol 530, among other examples. Additionally, or alternatively, the mobile station may determine an ADC bit number to use to receive the one or more subsequent communications.

As indicated above, FIG. 5 is provided as an example. Other examples may differ from what is described with regard to FIG. 5.

Figure 6:
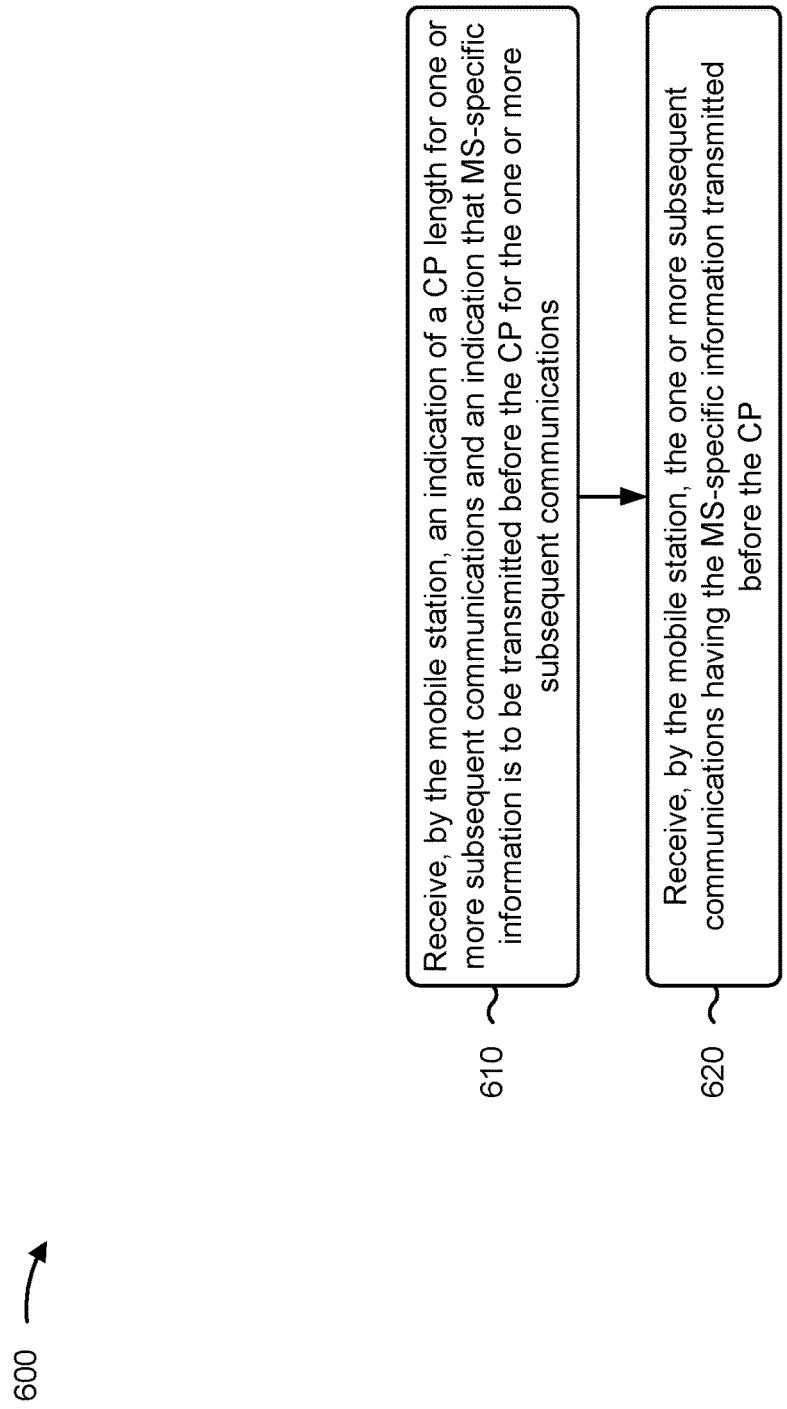
FIGS. 6 and 7 are diagrams illustrating example processes associated with communication of mobile station-specific information before a cyclic prefix, in accordance with the present disclosure.

FIG. 6 is a diagram illustrating an example process 600 performed, for example, by a mobile station, in accordance with the present disclosure. Example process 600 is an example where the mobile station (e.g., UE 120) performs operations associated with communication of mobile station-specific information before a cyclic prefix.

As shown in FIG. 6, in some aspects, process 600 may include receiving an indication of a CP length for one or more subsequent communications and an indication that MS-specific information is to be transmitted before the CP for the one or more subsequent communications (block 610). For example, the mobile station (e.g., using reception component 802, depicted in FIG. 8) may receive an indication of a CP length for one or more subsequent communications and an indication that MS-specific information is to be transmitted before the CP for the one or more subsequent communications, as described above.

As further shown in FIG. 6, in some aspects, process 600 may include receiving the one or more subsequent communications having the MS-specific information transmitted before the CP (block 620). For example, the mobile station (e.g., using reception component 802, depicted in FIG. 8) may receive the one or more subsequent communications having the MS-specific information transmitted before the CP, as described above.

Process 600 may include additional aspects, such as any single aspect or any combination of aspects described below and/or in connection with one or more other processes described elsewhere herein.

In a first aspect, receiving the indication of the CP length for the one or more subsequent communications and the indication that the MS-specific information is to be transmitted before the CP for the one or more subsequent communications comprises receiving the indication of the CP length for the one or more subsequent communications and the indication that the MS-specific information is to be transmitted before the CP for the one or more subsequent communications via one or more of downlink control information or medium access control signaling.

In a second aspect, alone or in combination with the first aspect, receiving the indication of the CP length for the one or more subsequent communications and the indication that the MS-specific information is to be transmitted before the CP for the one or more subsequent communications is based at least in part on one or more of an SINR that satisfies an SINR threshold, or an RSRP that satisfies an RSRP threshold.

In a third aspect, alone or in combination with one or more of the first and second aspects, receiving the indication of the CP length for the one or more subsequent communications and the indication that the MS-specific information is to be transmitted before the CP for the one or more subsequent communications is based at least in part on the MS being in a low-power mode.

In a fourth aspect, alone or in combination with one or more of the first through third aspects, the CP length is based at least in part on one or more of an SINR, or an RSRP.

In a fifth aspect, alone or in combination with one or more of the first through fourth aspects, a sum of a duration of the CP length and a duration of resources allocated for the MS-specific information is equal to a duration of a configured alternate CP length.

In a sixth aspect, alone or in combination with one or more of the first through fifth aspects, process 600 includes transmitting an indication of a capability of the MS to receive MS-specific information before the CP.

In a seventh aspect, alone or in combination with one or more of the first through sixth aspects, process 600 includes transmitting a request to receive MS-specific information before the CP.

In an eighth aspect, alone or in combination with one or more of the first through seventh aspects, the MS-specific information comprises one or more of an indication of a number of ADC converter bits to use for receiving the one or more subsequent communications, a coding rate configured for the one or more subsequent communications, a constellation configured for the one or more subsequent communications, an allocation signal, or an indication of an RNTI associated with the MS.

In a ninth aspect, alone or in combination with one or more of the first through eighth aspects, indication of the RNTI associated with the MS comprises a portion of the RNTI associated with the MS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
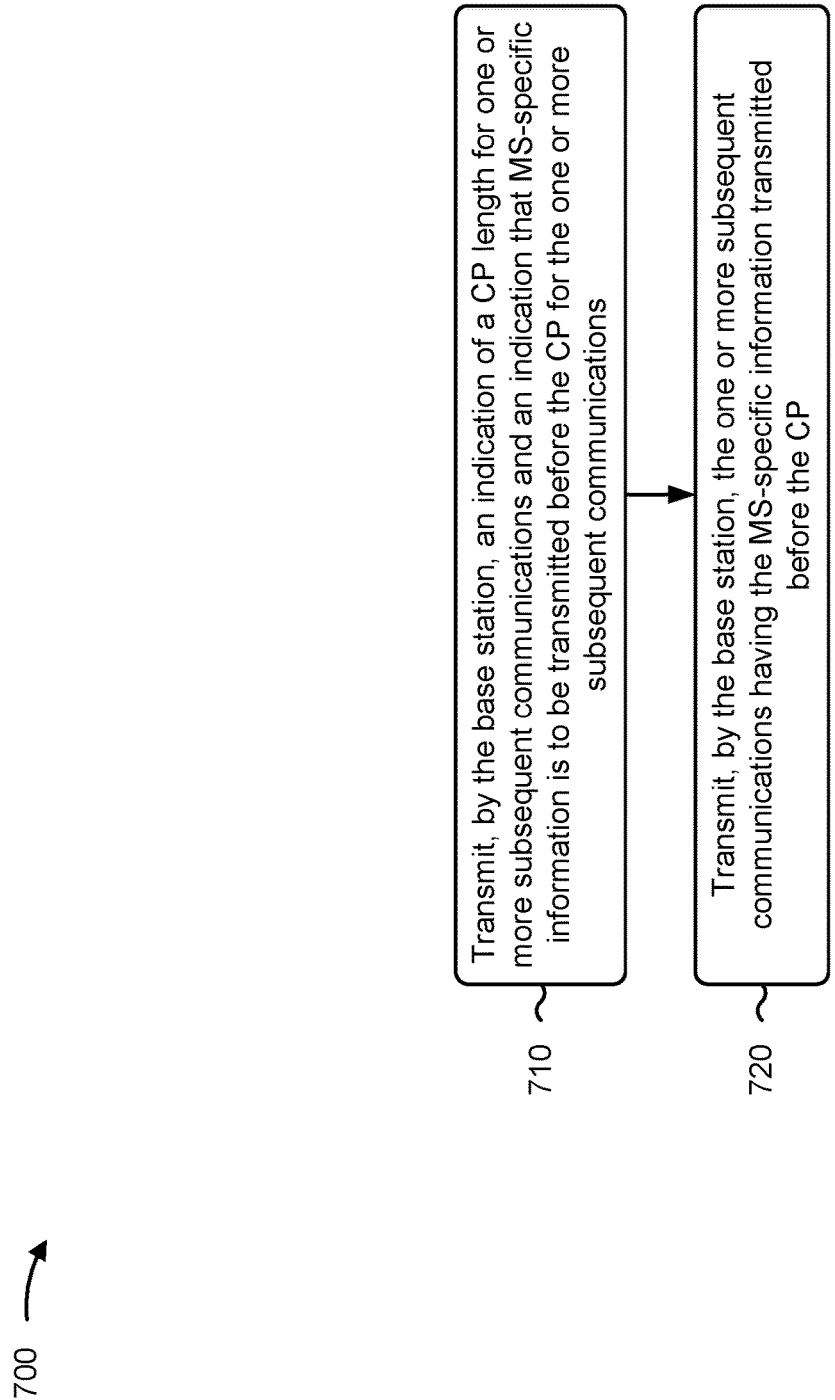

FIG. 7 is a diagram illustrating an example process 700 performed, for example, by a base station, in accordance with the present disclosure. Example process 700 is an example where the base station (e.g., base station 110) performs operations associated with communication of mobile station-specific information before a cyclic prefix.

As shown in FIG. 7, in some aspects, process 700 may include transmitting an indication of a CP length for one or more subsequent communications and an indication that MS specific information is to be transmitted before the CP for the one or more subsequent communications (block 710). For example, the base station (e.g., using transmission component 904, depicted in FIG. 9) may transmit an indication of a CP length for one or more subsequent communications and an indication that mobile station (MS) specific information is to be transmitted before the CP for the one or more subsequent communications, as described above.

As further shown in FIG. 7, in some aspects, process 700 may include transmitting the one or more subsequent communications having the MS-specific information transmitted before the CP (block 720). For example, the base station (e.g., using transmission component 904, depicted in FIG. 9) may transmit the one or more subsequent communications having the MS-specific information transmitted before the CP, as described above.

Process 700 may include additional aspects, such as any single aspect or any combination of aspects described below and/or in connection with one or more other processes described elsewhere herein.

In a first aspect, transmitting the indication of the CP length for the one or more subsequent communications and the indication that the MS-specific information is to be transmitted before the CP for the one or more subsequent communications comprises transmitting the indication of the CP length for the one or more subsequent communications and the indication that the MS-specific information is to be transmitted before the CP for the one or more subsequent communications via one or more of downlink control information or medium access control signaling.

In a second aspect, alone or in combination with the first aspect, transmitting the indication of the CP length for the one or more subsequent communications and the indication that the MS-specific information is to be transmitted before the CP for the one or more subsequent communications is based at least in part on one or more of an SINR that satisfies an SINR threshold, or an RSRP that satisfies an RSRP threshold.

In a third aspect, alone or in combination with one or more of the first and second aspects, transmitting the indication of the CP length for the one or more subsequent communications and the indication that the MS-specific information is to be transmitted before the CP for the one or more subsequent communications is based at least in part on the MS being in a low-power mode.

In a fourth aspect, alone or in combination with one or more of the first through third aspects, the CP length is based at least in part on one or more of an SINR, or an RSRP.

In a fifth aspect, alone or in combination with one or more of the first through fourth aspects, a sum of a duration of the CP length and a duration of resources allocated for the MS-specific information is equal to a duration of a configured alternate CP length.

In a sixth aspect, alone or in combination with one or more of the first through fifth aspects, process 700 includes receiving an indication of a capability of the MS to receive MS-specific information before the CP.

In a seventh aspect, alone or in combination with one or more of the first through sixth aspects, process 700 includes receiving a request to receive MS-specific information before the CP.

In an eighth aspect, alone or in combination with one or more of the first through seventh aspects, the MS-specific information comprises one or more of an indication of a number of ADC converter bits to use for receiving the one or more subsequent communications, a coding rate configured for the one or more subsequent communications, a constellation configured for the one or more subsequent communications, an allocation signal, or an indication of an RNTI associated with the MS.

In a ninth aspect, alone or in combination with one or more of the first through eighth aspects, indication of the RNTI associated with the MS comprises a portion of the RNTI associated with the MS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
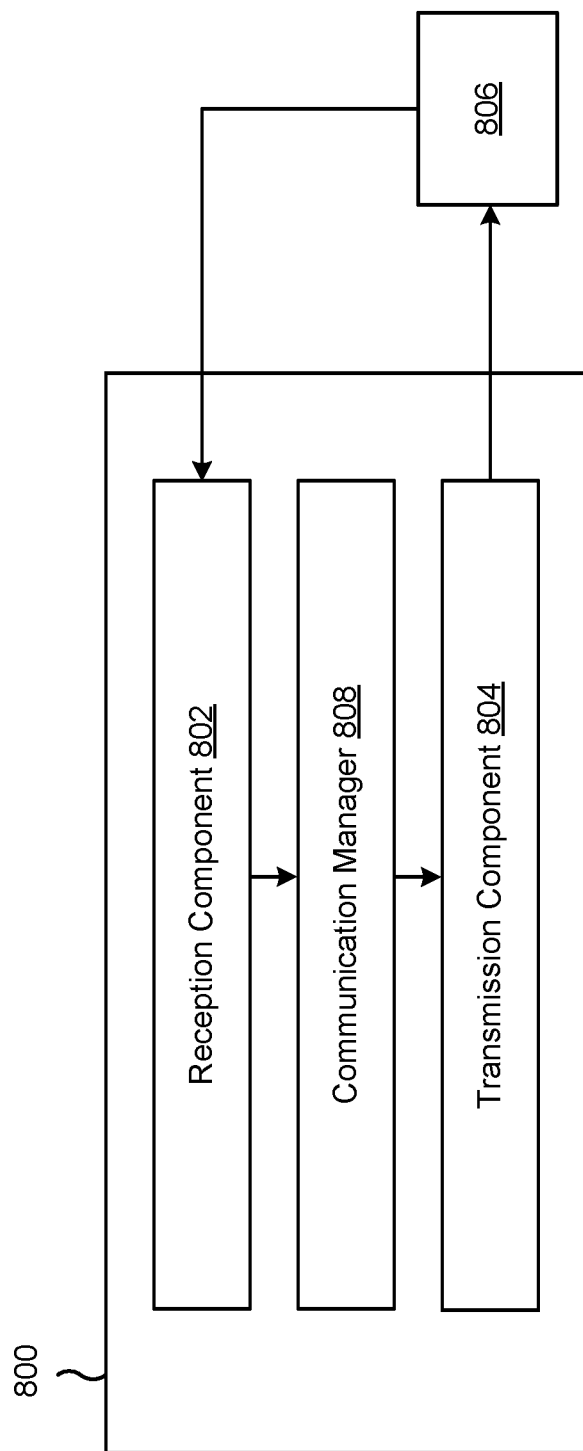
FIGS. 8 and 9 are block diagrams of example apparatuses for wireless communication, in accordance with the present disclosure.

FIG. 8 is a block diagram of an example apparatus 800 for wireless communication. The apparatus 800 may be a mobile station, or a mobile station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the mobile station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the mobile station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the mobile station described above in connection with FIG. 2. In some aspects, the transmission component 804 may be co-located with the reception component 802 in a transceiver.

The reception component 802 may receive an indication of a CP length for one or more subsequent communications and an indication that MS-specific information is to be transmitted before the CP for the one or more subsequent communications. The reception component 802 may receive the one or more subsequent communications having the MS-specific information transmitted before the CP.

The transmission component 804 may transmit an indication of a capability of the MS to receive MS-specific information before the CP.

The transmission component 804 may transmit a request to receive MS-specific information before the CP.

The communication manager 808 may manage and/or configure communications between the apparatus 800 and the apparatus 806.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
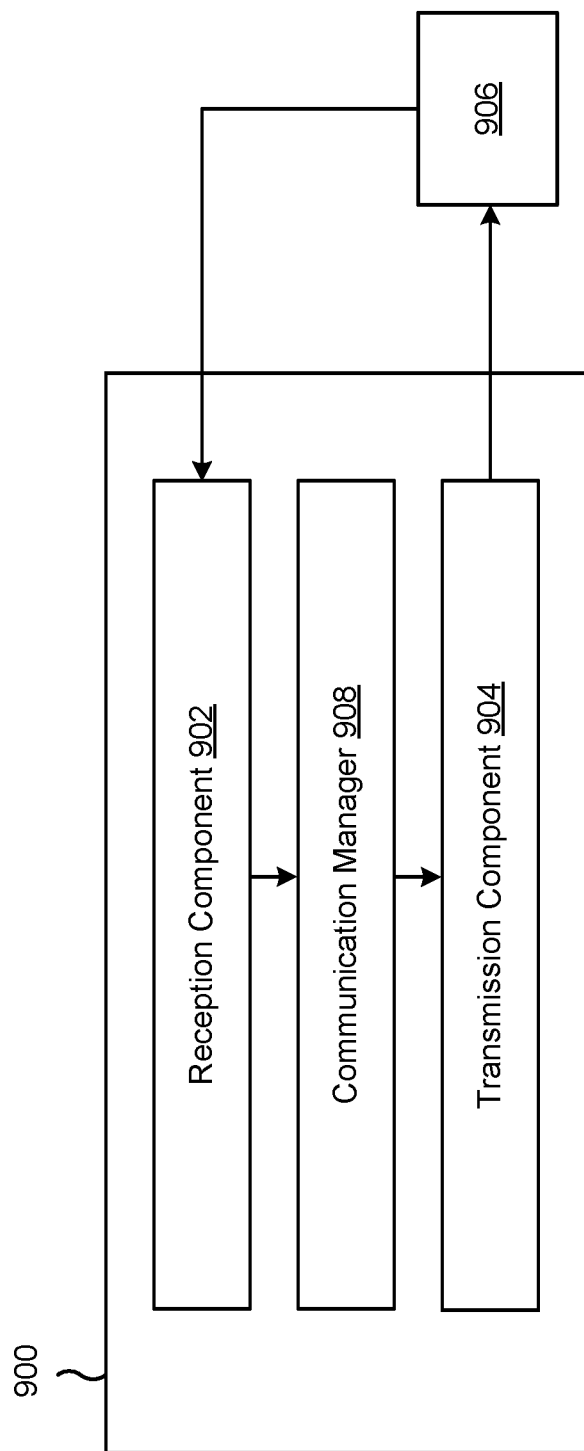

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit an indication of a CP length for one or more subsequent communications and an indication that MS specific information is to be transmitted before the CP for the one or more subsequent communications. The transmission component 904 may transmit the one or more subsequent communications having the MS-specific information transmitted before the CP.

The reception component 902 may receive an indication of a capability of the MS to receive MS-specific information before the CP.

The reception component 902 may receive a request to receive MS-specific information before the CP.

The communication manager 908 may manage, schedule, and/or configure communications between the apparatus 900 and the apparatus 906.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a mobile station (MS), comprising: receiving, by the mobile station, an indication of a cyclic prefix (CP) length for one or more subsequent communications and an indication that MS-specific information is to be transmitted before the CP for the one or more subsequent communications; and receiving, by the mobile station, the one or more subsequent communications having the MS-specific information transmitted before the CP.

Aspect 2: The method of Aspect 1, wherein receiving the indication of the CP length for the one or more subsequent communications and the indication that the MS-specific information is to be transmitted before the CP for the one or more subsequent communications comprises: receiving the indication of the CP length for the one or more subsequent communications and the indication that the MS-specific information is to be transmitted before the CP for the one or more subsequent communications via one or more of downlink control information or medium access control signaling.

Aspect 3: The method of any of Aspects 1-2, wherein receiving the indication of the CP length for the one or more subsequent communications and the indication that the MS-specific information is to be transmitted before the CP for the one or more subsequent communications is based at least in part on one or more of: a signal-to-interference-plus-noise ratio (SINR) that satisfies an SINR threshold, or a reference signal received power (RSRP) that satisfies an RSRP threshold.

Aspect 4: The method of any of Aspects 1-3, wherein receiving the indication of the CP length for the one or more subsequent communications and the indication that the MS-specific information is to be transmitted before the CP for the one or more subsequent communications is based at least in part on the MS being in a low-power mode.

Aspect 5: The method of any of Aspects 1-4, wherein the CP length is based at least in part on one or more of: a signal-to-interference-plus-noise ratio (SINR), or a reference signal received power (RSRP).

Aspect 6: The method of any of Aspects 1-5, wherein a sum of a duration of the CP length and a duration of resources allocated for the MS-specific information is equal to a duration of a configured alternate CP length.

Aspect 7: The method of any of Aspects 1-6, further comprising: transmitting an indication of a capability of the MS to receive MS-specific information before the CP.

Aspect 8: The method of any of Aspects 1-7, further comprising: transmitting a request to receive MS-specific information before the CP.

Aspect 9: The method of any of Aspects 1-8, wherein the MS-specific information comprises one or more of: an indication of a number of analog-to-digital (ADC) converter bits to use for receiving the one or more subsequent communications, a coding rate configured for the one or more subsequent communications, a constellation configured for the one or more subsequent communications, an allocation signal, or an indication of a radio network temporary identification (RNTI) associated with the MS.

Aspect 10: The method of any of Aspects 1-9, wherein indication of the RNTI associated with the MS comprises a portion of the RNTI associated with the MS.

Aspect 11: A method of wireless communication performed by a base station, comprising: transmitting, by the base station, an indication of a cyclic prefix (CP) length for one or more subsequent communications and an indication that mobile station (MS) specific information is to be transmitted before the CP for the one or more subsequent communications; and transmitting, by the base station, the one or more subsequent communications having the MS-specific information transmitted before the CP.

Aspect 12: The method of Aspect 11, wherein transmitting the indication of the CP length for the one or more subsequent communications and the indication that the MS-specific information is to be transmitted before the CP for the one or more subsequent communications comprises: transmitting the indication of the CP length for the one or more subsequent communications and the indication that the MS-specific information is to be transmitted before the CP for the one or more subsequent communications via one or more of downlink control information or medium access control signaling.

Aspect 13: The method of any of Aspects 11-12, wherein transmitting the indication of the CP length for the one or more subsequent communications and the indication that the MS-specific information is to be transmitted before the CP for the one or more subsequent communications is based at least in part on one or more of: a signal-to-interference-plus-noise ratio (SINR) that satisfies an SINR threshold, or a reference signal received power (RSRP) that satisfies an RSRP threshold.

Aspect 14: The method of any of Aspects 11-13, wherein transmitting the indication of the CP length for the one or more subsequent communications and the indication that the MS-specific information is to be transmitted before the CP for the one or more subsequent communications is based at least in part on the MS being in a low-power mode.

Aspect 15: The method of any of Aspects 11-14, wherein the CP length is based at least in part on one or more of: a signal-to-interference-plus-noise ratio (SINR), or a reference signal received power (RSRP).

Aspect 16: The method of any of Aspects 11-15, wherein a sum of a duration of the CP length and a duration of resources allocated for the MS-specific information is equal to a duration of a configured alternate CP length.

Aspect 17: The method of any of Aspects 11-16, further comprising: receiving an indication of a capability of the MS to receive MS-specific information before the CP.

Aspect 18: The method of any of Aspects 11-17, further comprising: receiving a request to receive MS-specific information before the CP.

Aspect 19: The method of any of Aspects 11-18, wherein the MS-specific information comprises one or more of: an indication of a number of analog-to-digital (ADC) converter bits to use for receiving the one or more subsequent communications, a coding rate configured for the one or more subsequent communications, a constellation configured for the one or more subsequent communications, an allocation signal, or an indication of a radio network temporary identification (RNTI) associated with the MS.

Aspect 20: The method of any of Aspects 11-19, wherein indication of the RNTI associated with the MS comprises a portion of the RNTI associated with the MS.

Aspect 21: An apparatus for wireless communication at a device, comprising a processor; memory coupled with the processor; and instructions stored in the memory and executable by the processor to cause the apparatus to perform the method of one or more Aspects of Aspects 1-20.

Aspect 22: A device for wireless communication, comprising a memory and one or more processors coupled to the memory, the memory and the one or more processors configured to perform the method of one or more Aspects of Aspects 1-20.

Aspect 43: An apparatus for wireless communication, comprising at least one means for performing the method of one or more Aspects of Aspects 1-20.

Aspect 24: A non-transitory computer-readable medium storing code for wireless communication, the code comprising instructions executable by a processor to perform the method of one or more Aspects of Aspects 1-20.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a mobile station (MS), comprising:
receiving, by the mobile station, an indication of a cyclic prefix (CP) length for one or more subsequent communications and an indication that MS-specific information is to be transmitted before the CP for the one or more subsequent communications; and receiving, by the mobile station, the one or more subsequent communications having the MS-specific information transmitted within a CP portion of a symbol.

2. The method of claim 1, wherein receiving the indication of the CP length for the one or more subsequent communications and the indication that the MS-specific information is to be transmitted before the CP for the one or more subsequent communications comprises: receiving the indication of the CP length for the one or more subsequent communications and the indication that the MS-specific information is to be transmitted before the CP for the one or more subsequent communications via one or more of downlink control information or medium access control signaling.

3. The method of claim 1, wherein receiving the indication of the CP length for the one or more subsequent communications and the indication that the MS-specific information is to be transmitted before the CP for the one or more subsequent communications is based at least in part on one or more of: a signal-to-interference-plus-noise ratio (SINR) that satisfies an SINR threshold, or a reference signal received power (RSRP) that satisfies an RSRP threshold.

4. The method of claim 1, wherein receiving the indication of the CP length for the one or more subsequent communications and the indication that the MS-specific information is to be transmitted before the CP for the one or more subsequent communications is based at least in part on the MS being in a low-power mode.

5. The method of claim 1, wherein the CP length is based at least in part on one or more of: a signal-to-interference-plus-noise ratio (SINK), or a reference signal received power (RSRP).

6. The method of claim 1, wherein a sum of a duration of the CP length and a duration of resources allocated for the MS-specific information is equal to a duration of a configured alternate CP length.

7. The method of claim 1, further comprising: transmitting an indication of a capability of the MS to receive MS-specific information before the CP.

8. The method of claim 1, further comprising: transmitting a request to receive MS-specific information before the CP.

9. The method of claim 1, wherein the MS-specific information comprises one or more of: an indication of a number of analog-to-digital (ADC) converter bits to use for receiving the one or more subsequent communications, a coding rate configured for the one or more subsequent communications, a constellation configured for the one or more subsequent communications, an allocation signal, or an indication of a radio network temporary identification (RNTI) associated with the MS.

10. The method of claim 9, wherein indication of the RNTI associated with the MS comprises a portion of the RNTI associated with the MS.

11. A mobile station (MS) for wireless communication, comprising: a memory; and one or more processors, operatively coupled to the memory, configured to: receive an indication of a cyclic prefix (CP) length for one or more subsequent communications and an indication that MS-specific information is to be transmitted before the CP for the one or more subsequent communications; and receive the one or more subsequent communications having the MS-specific information transmitted within a CP portion of a symbol.

12. The MS of claim 11, wherein the one or more processors are configured to: receive the indication of the CP length for the one or more subsequent communications and the indication that the MS-specific information is to be transmitted before the CP for the one or more subsequent communications via one or more of downlink control information or medium access control signaling.

13. The MS of claim 11, wherein reception of the indication of the CP length for the one or more subsequent communications and the indication that the MS-specific information is to be transmitted before the CP for the one or more subsequent communications is based at least in part on one or more of: a signal-to-interference-plus-noise ratio (SINK) that satisfies an SINK threshold, or a reference signal received power (RSRP) that satisfies an RSRP threshold.

14. The MS of claim 11, wherein reception of the indication of the CP length for the one or more subsequent communications and the indication that the MS-specific information is to be transmitted before the CP for the one or more subsequent communications is based at least in part on the MS being in a low-power mode.

15. The MS of claim 11, wherein the CP length is based at least in part on one or more of: a signal-to-interference-plus-noise ratio (SINR), or a reference signal received power (RSRP).

16. The MS of claim 11, wherein a sum of a duration of the CP length and a duration of resources allocated for the MS-specific information is equal to a duration of a configured alternate CP length.

17. The MS of claim 11, wherein the one or more processors are further configured to: transmit an indication of a capability of the MS to receive MS-specific information before the CP.

18. The MS of claim 11, wherein the one or more processors are further configured to: transmit a request to receive MS-specific information before the CP.

19. The MS of claim 11, wherein the MS-specific information comprises one or more of: an indication of a number of analog-to-digital (ADC) converter bits to use for receiving the one or more subsequent communications, a coding rate configured for the one or more subsequent communications, a constellation configured for the one or more subsequent communications, an allocation signal, or an indication of a radio network temporary identification (RNTI) associated with the MS.

20. The MS of claim 19, wherein indication of the RNTI associated with the MS comprises a portion of the RNTI associated with the MS.

21. An apparatus for wireless communication, comprising: means for receiving an indication of a cyclic prefix (CP) length for one or more subsequent communications and an indication that apparatus-specific information is to be transmitted before the CP for the one or more subsequent communications; and means for receiving the one or more subsequent communications having the apparatus-specific information transmitted within a CP portion of a symbol.

22. The apparatus of claim 21, wherein receiving the indication of the CP length for the one or more subsequent communications and the indication that the apparatus-specific information is to be transmitted before the CP for the one or more subsequent communications is based at least in part on one or more of: a signal-to-interference-plus-noise ratio (SINK) that satisfies an SINK threshold, or a reference signal received power (RSRP) that satisfies an RSRP threshold.

23. The apparatus of claim 21, wherein receiving the indication of the CP length for the one or more subsequent communications and the indication that the apparatus-specific information is to be transmitted before the CP for the one or more subsequent communications is based at least in part on the apparatus being in a low-power mode.

24. The apparatus of claim 21, further comprising: means for transmitting an indication of a capability of the apparatus to receive apparatus-specific information before the CP, means for transmitting a request to receive apparatus-specific information before the CP, or a combination thereof.

25. The apparatus of claim 21 wherein the apparatus-specific information comprises one or more of: an indication of a number of analog-to-digital (ADC) converter bits to use for receiving the one or more subsequent communications, a coding rate configured for the one or more subsequent communications, a constellation configured for the one or more subsequent communications, an allocation signal, or an indication of a radio network temporary identification (RNTI) associated with the apparatus.

26. A non-transitory computer-readable medium storing a set of instructions for wireless communication, the set of instructions comprising: one or more instructions that, when executed by one or more processors of a mobile station (MS), cause the MS to: receive an indication of a cyclic prefix (CP) length for one or more subsequent communications and an indication that MS-specific information is to be transmitted before the CP for the one or more subsequent communications; and receive the one or more subsequent communications having the MS-specific information transmitted within a CP portion of a symbol.

27. The non-transitory computer-readable medium of claim 26, wherein receiving the indication of the CP length for the one or more subsequent communications and the indication that the MS-specific information is to be transmitted before the CP for the one or more subsequent communications is based at least in part on one or more of: a signal-to-interference-plus-noise ratio (SINK) that satisfies an SINK threshold, or a reference signal received power (RSRP) that satisfies an RSRP threshold.

28. The non-transitory computer-readable medium of claim 26, wherein receiving the indication of the CP length for the one or more subsequent communications and the indication that the MS-specific information is to be transmitted before the CP for the one or more subsequent communications is based at least in part on the MS being in a low-power mode.

29. The non-transitory computer-readable medium of claim 26, wherein the one or more instructions further cause the MS to: transmit an indication of a capability of the MS to receive MS-specific information before the CP, transmit a request to receive MS-specific information before the CP, or a combination thereof.

30. The non-transitory computer-readable medium of claim 26, wherein the MS-specific information comprises one or more of: an indication of a number of analog-to-digital (ADC) converter bits to use for receiving the one or more subsequent communications, a coding rate configured for the one or more subsequent communications, a constellation configured for the one or more subsequent communications, an allocation signal, or an indication of a radio network temporary identification (RNTI) associated with the MS.

* * * * *